United States Patent [19]
Chen et al.

[11] Patent Number: 6,084,792
[45] Date of Patent: Jul. 4, 2000

[54] POWER CONVERTER WITH CIRCUITS FOR PROVIDING GATE DRIVING

[75] Inventors: Wei Chen, Campbell, Calif.; Guichao Hua, Hangzhou, China; Daniel M. Sable; Stephen J. Butler, both of Blacksburg, Va.

[73] Assignee: VPT, Inc., Blacksburg, Va.

[21] Appl. No.: 09/376,616

[22] Filed: Aug. 18, 1999

Related U.S. Application Data

[60] Provisional application No. 60/097,393, Aug. 21, 1998.

[51] Int. Cl.$^7$ .................................................. H02M 7/217
[52] U.S. Cl. ............................................. 363/127; 363/89
[58] Field of Search ............................... 363/127, 89, 90, 363/126

[56] References Cited

U.S. PATENT DOCUMENTS

| 5,179,512 | 1/1993 | Fisher et al. ............................... 363/127 |
| 5,663,877 | 9/1997 | Dittli et al. ................................. 363/127 |

OTHER PUBLICATIONS

W. Tabisz, F. Lee, and D. Chen. "A MOSFET Resonant Synchronous Rectifier for High Frequency DC/DC Converters",IEEE PESC, pp. 769–779 Dec. 1990.

J. Cobos, O. Garcia, J. Sebastian, J.Uceda. "Active clamp PWM forward converter with self–driven synchronous rectification", IEEE.

International Telecommunication Energy Conference Proceedings, pp. 200–206, Dec. 1993.

M. Jovanovic, J. Lin, C. Zhou, M. Zhang, F. Lee, "Design considerations for forward converter with self–driven synchronous rectifiers", VPEC '93 proceedings, pp. 105–112, Sep. 1993.

C. Blake Jr., D. Kinzer, and P.Wood, "Synchronous Rectifiers Versus Schottky Diodes: A Comparison of the Losses of a Synchronous Rectifier vs. the Losses of a Schottky Diode Rectifier", IEEE APEC '94, pp. 17–23, Feb. 1994.

L. Balogh, "The Performance of the Current Doubler Rectifier with Synchronous Rectification", HFPC, 95 pp. 216–225. May 1995.

W. Chen, G. Hua, D. Sable,and F. Lee, "Design of High Efficiency, Low Profile, Low Voltage Converter With Integrated Magnetics", IEEE APEC '97 Proceedings, pp. 911–917, Feb. 1997.

*Primary Examiner*—Shawn Riley
*Attorney, Agent, or Firm*—Enrique J. Mora; Holland & Knight, LLP

[57] ABSTRACT

A power converter using a switching signal having at least three levels of amplitude, one of which amplitude levels has a zero amplitude level during a predetermined switching interval, is provided. The power converter includes a circuit module having first and second input terminals for receiving the switching signal. The circuit module in turn is made up of a first power transistor and second power transistor. Circuitry is electrically coupled to a predetermined one of the power transistors for maintaining a predetermined voltage level across the gate terminal of the predetermined one of the power transistors during the switching interval of zero amplitude. The predetermined voltage level is chosen to enable that predetermined power transistor to continue in a respective "on" state notwithstanding of the presence of the switching interval of substantially zero amplitude. The circuitry further allows for removing or discharging the predetermined voltage upon termination of the switching interval of zero amplitude level to enable the predetermined power transistor to transition to a respective "off" state. The power converter may be conveniently used to extend a self-driving synchronous rectification technique to a broader range of output voltages and circuit topologies and provides over-voltage protection to the gates power transistors, and the capability to directly parallel additional modules.

62 Claims, 11 Drawing Sheets

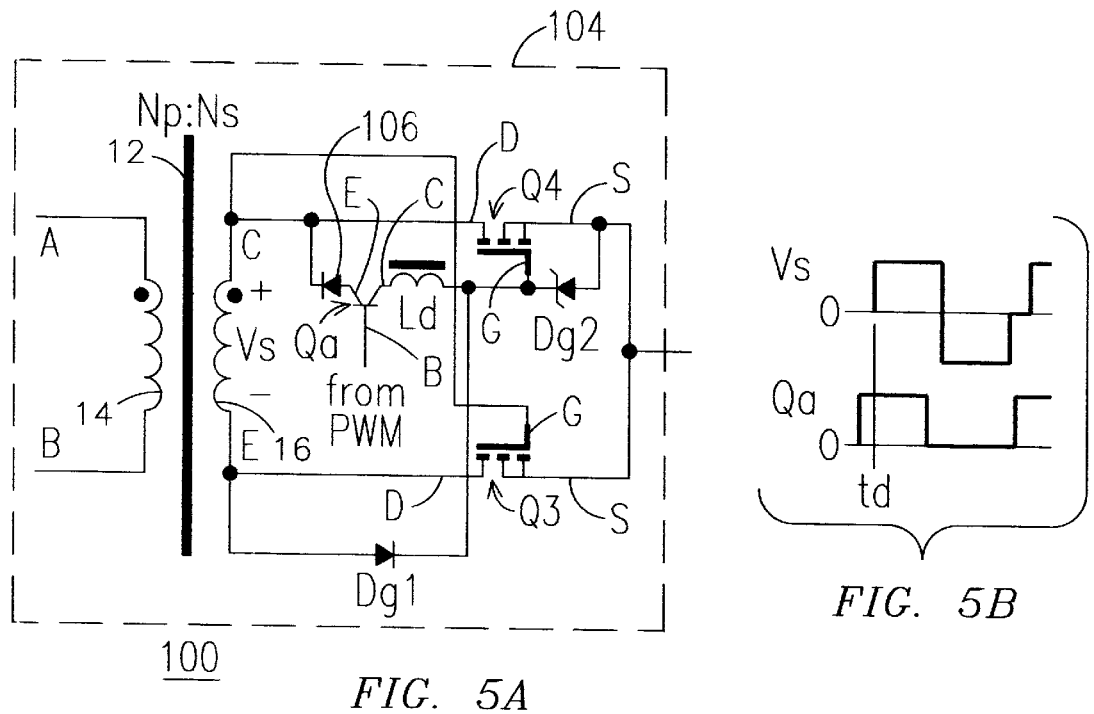
FIG. 5A
FIG. 5B
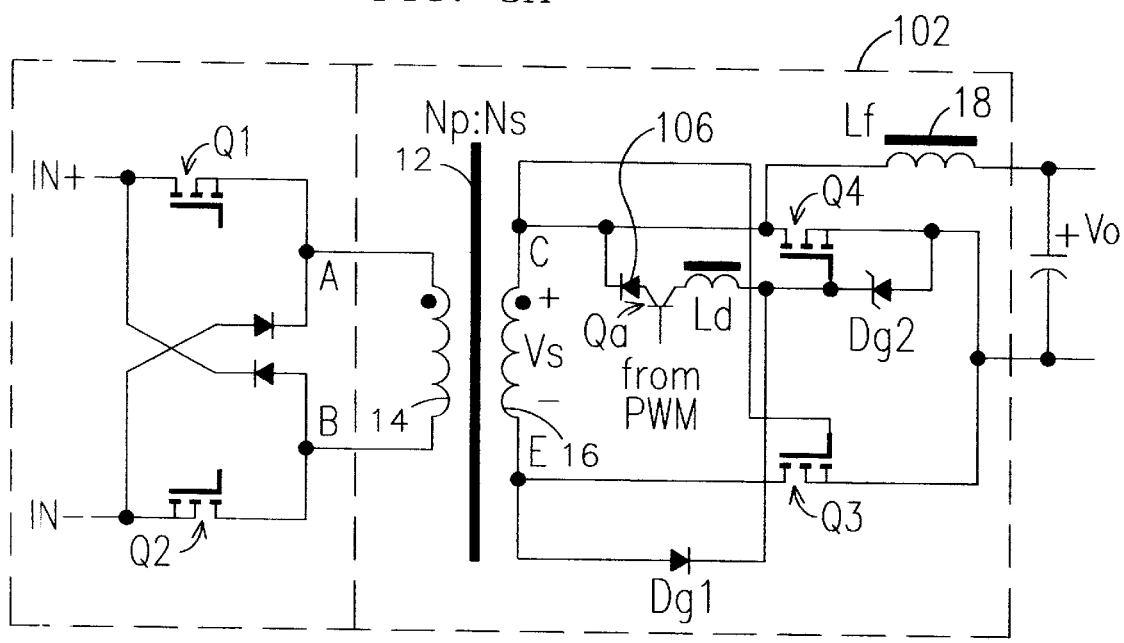
FIG. 5C
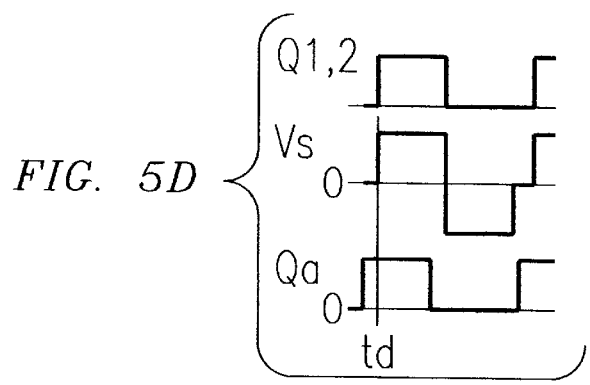
FIG. 5D

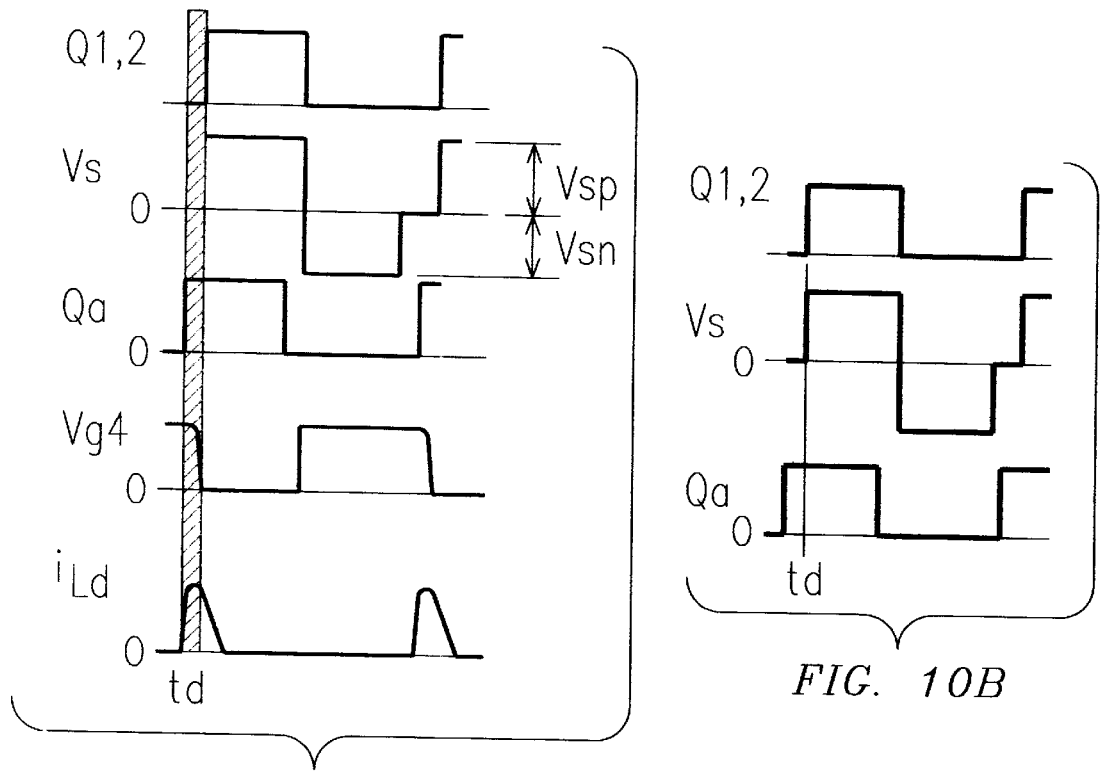
FIG. 6C
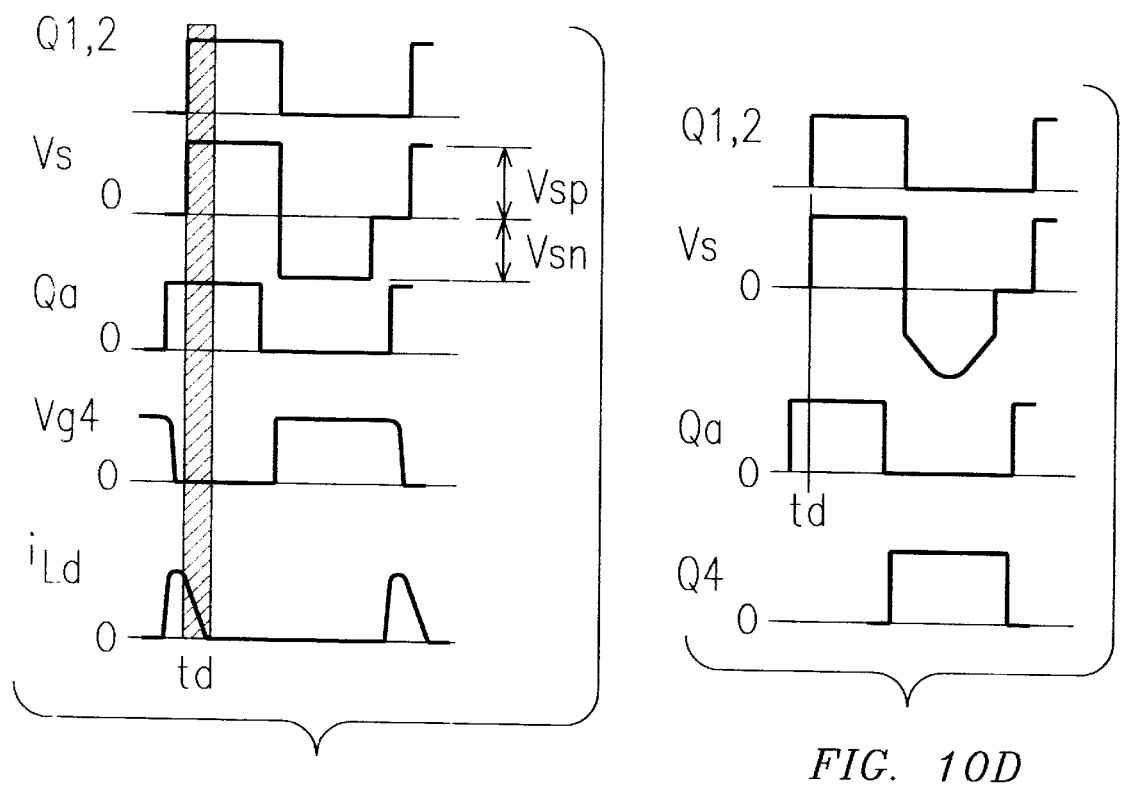
FIG. 6F
FIG. 10B
FIG. 10D

Direct self-driven waveform: top-$V_{gs,Q4}$ (5V/div), bottom-$V_{pri}$(40V/div);

Improved hybrid drive: top-$I_{Ld}$ (0.5A/div), middle-$V_{gs,Q4}$ (5V/div), bottom-$V_{pri}$(40V/div);

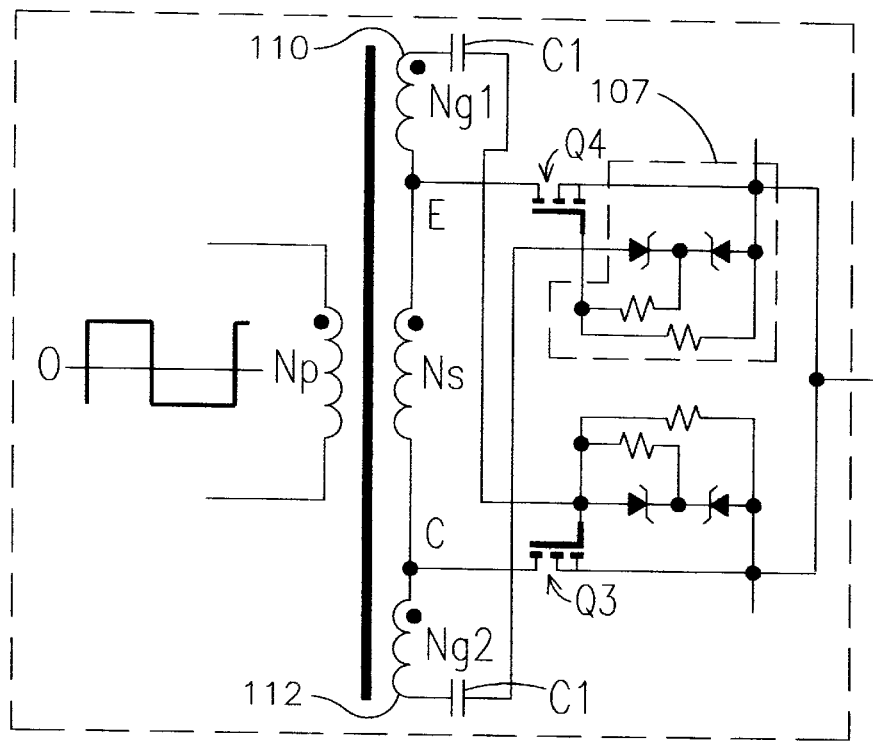
FIG. 12A
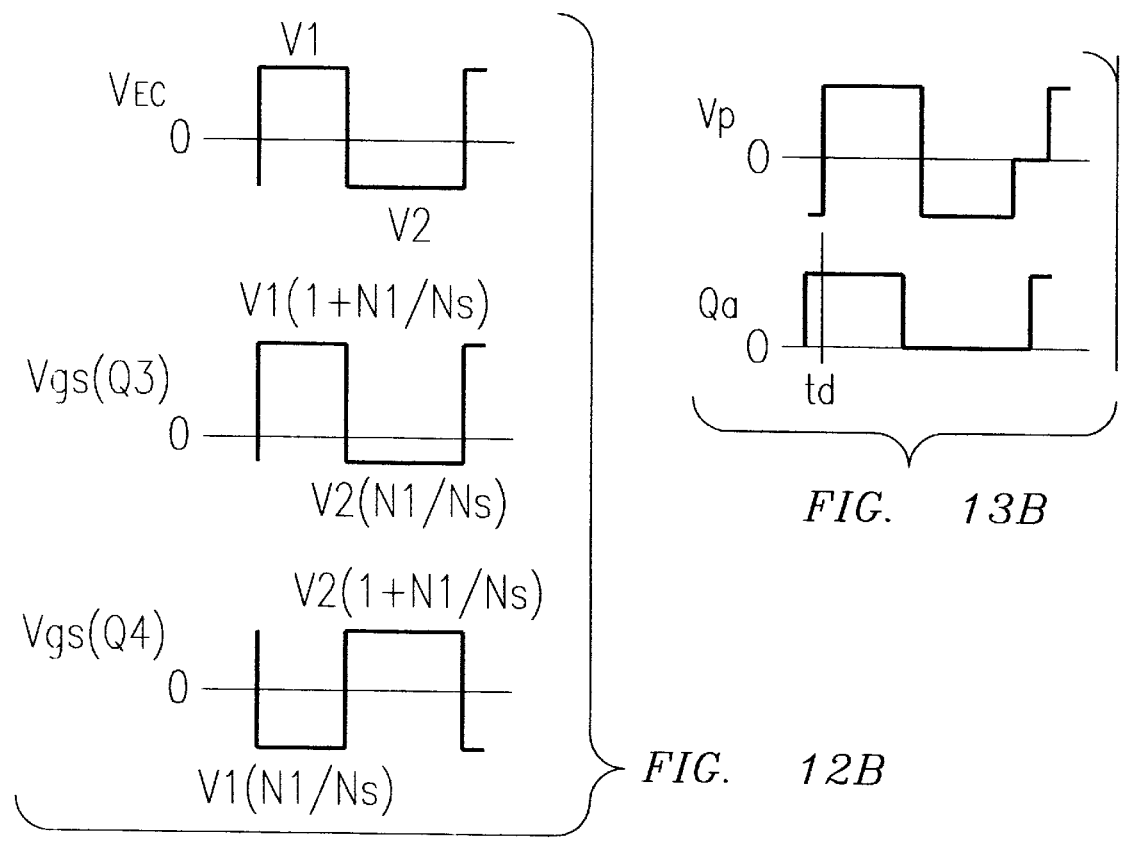
FIG. 12B
FIG. 13B

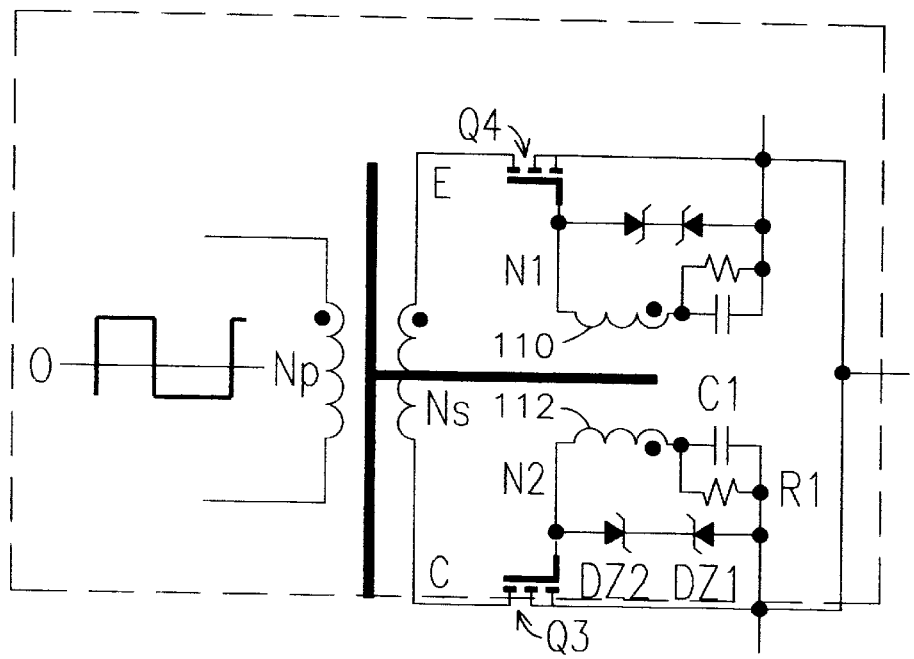
FIG. 12C
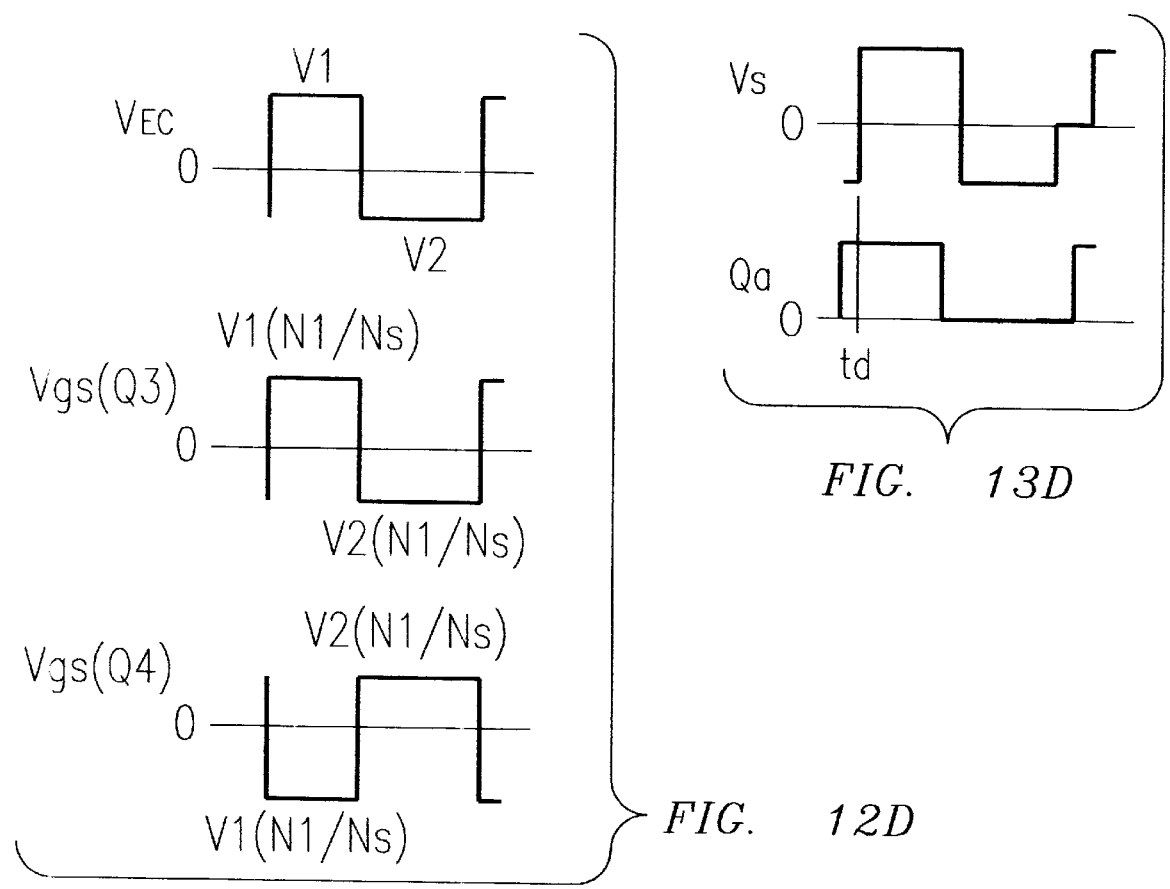
FIG. 13D
FIG. 12D

POWER CONVERTER WITH CIRCUITS FOR PROVIDING GATE DRIVING

This application claims the benefit of U.S. Provisional Application 60/097,393, filed Aug. 21, 1998.

This invention was made with U.S. Government support under contract number F29601-97-C-0037 awarded by U.S. Air Force Research Laboratory and, in accordance with the terms set forth in said contract, the U.S. Government has certain rights in the invention.

BACKGROUND OF THE INVENTION

This invention applies to the field of power conversion, and, more particularly, to the field of DC-to-DC conversion, such as may be used for relatively low voltage and relatively high current applications generally requiring substantially high efficiency.

For isolated low voltage high current power supply circuits that generally use semiconductor devices such, as power transistor rectifiers, diodes, e.g. Schottky diodes, etc., the power loss in the rectifiers is usually dominant. As will be appreciated by those skilled in the art, synchronous rectification is generally necessary when the output voltage is below about 5 V, because the voltage drop (e.g., 0.3 V) of even the best of Schottky diodes takes or consumes an excessive percentage of the output voltage. The poor efficiency caused by using such Schottky diodes may also increase the thermal stress in the primary side semiconductor devices, the power components of the front-end converters (ac/dc, etc.), and the power distributing paths, because the input power of the low voltage power supply increases substantially. Therefore, using a Schottky diode may increase thermal stress on both the rectifier itself and the overall power converter system.

A presently available state-of-the-art low-voltage power transistor, such as a metal oxide semiconductor field effect transistor (MOSFET) may provide as low as 4 mohm of on-resistance when it is properly driven. If, for example, the current stress on each rectifier device is below about 30 A, synchronous rectification using such low on-resistance MOSFETs will in general yield a performance superior to that of a Schottky diode. Consequently, synchronous rectification is generally a well-desired technique of power conversion for low voltage, high current power conversion applications.

FIGS. 1(a)–1(c) collectively show a representative prior art power conversion system 10, using a transformer core 12 electromagnetically coupled to respective primary and secondary windings 14 and 16 respectively. Primary winding 14 may have a respective number of turns (Np) and is generally coupled to receive an input waveform, such as input waveform 17 to induce a switching signal Vs across secondary winding 16 having a respective number of turns (Ns). Two synchronous rectifiers (SR) or power transistors Q3 and Q4 are electronically coupled in a common-source configuration, as shown in FIG. 1, to facilitate the respective gate driving of power transistors Q3 and Q4. As used herein the terminology of synchronous rectifiers and power transistors will be used interchangeable, unless otherwise indicated. FIG. 1(a) shows the arrangement of SRs Q3 and Q4 in a two-inductor output circuit as represented by output inductors 18 and 20, while FIG. 1(b) describes the case with a one-inductor output circuit, as represented by single inductor 18. It will be appreciated that secondary winding 16 could be a center-tapped winding and thus output inductor 18 could be connected to a suitable center-tap connecting point in lieu of connecting point C. The common architecture of these two circuits cases is shown in FIG. 1(c). In the following discussion, the diagram shown in FIG. 1(c) will be used to describe various known driving schemes of SRs Q3 and Q4. As will be readily appreciated by those skilled in the art, each SR has respective terminals such as gate, drain and source terminals, designated by the letters G, D and S, respectively.

As shown in FIG. 2 and FIG. 3, respectively, there are two prior-art driving schemes for SRs Q3 and Q4. The two schemes are generally known as external driving and direct self-driving, respectively. Although an external driving circuit, such as shown in FIG. 2, may be able to provide a somewhat adequate driving or gating voltage on the respective gates of SRs Q3 and Q4, unfortunately, as explained below, there are several limitations in this technique. For example, it will be appreciated that SRs Q3 and Q4 are generally low voltage high current MOSFETs, which generally have excessively large gate capacitance. Thus, SR MOSFETs having lower values of static drain-source on-state resistance, ($R_{ds,on}$) tend to have higher gate drive loss. Further, presently available MOSFET drivers, such as MOSFET drivers 22 and 24, are generally not able to provide the required driving current at high switching frequency. The external drive scheme also requires delicate control on the gate driving timing. To maximize the conduction time of the two SRs without losing zero-voltage turn-on and causing cross-conduction between one another, the gate timing has to be very accurately controlled. Therefore, a practical switching frequency when employing an external driving technique is usually limited to about 30–40 KHz. This relatively low switching frequency increases the overall size of the power converter.

A direct self-driving circuit is shown in FIG. 3 and since a respective body diode of the SRs will generally conduct before its respective MOSFET portion, zero-voltage turn-on of each SR may be achieved without undue difficulty in such self-driving circuit. Further, since most of the energy stored in a respective gate capacitor of each SR is recovered, the driving loss is somewhat reduced. Thus, the switching frequency for most silicon-based synchronous rectifiers using the direct self-driving technique can be pushed to around 500 KHz. Unfortunately, as described below, there are still substantial limitations in the direct self-driving technique. By way of illustration such technique:

i) may only be suitable for circuit topologies whose secondary voltage amplitude has only two states: positive and negative. For circuits whose transformer winding provides substantially zero voltage amplitude during a certain interval of the switching period, e.g., a two-switch forward, a resonant reset forward or a standard half-bridge (H-B) converter, this technique is not suitable. Thus, in a forward converter configuration, a cumbersome active-clamp reset scheme would be necessary for applying this gate drive scheme; conversely, in HB circuits, it is believed that only an asymmetrical duty cycle control would be capable of implementing a direct self-driven synchronous rectification technique;

ii) may be unsuitable for very high or very low output voltage because the transformer secondary side voltage will generally be out of range for driving the MOSFET gate. The output voltage range for applying this technique is usually limited to a voltage range of about 2.5 V~7.5 V;

iii) does not provide over-voltage protection on the SR's gate. This may cause reliability problems and increased operational costs; and iv) does not allow for building flexible power converter architectures, such as modular architectures, since power converter modules having directly self-driven SRs cannot be paralleled. As shown in FIG. 4, for example, if a second power converter module 26 is powered up before a first power converter module 28, the output bus voltage will be coupled the respective gates of SRs Q3 and Q4 in module 28. When the output bus voltage is large enough, both SRs in module 28 will be biased on, and thus resulting in a highly undesirable short circuit on the output side.

It will be appreciated that power converters capable of being expanded through a modular architecture, such as with parallel coupling, are very important to high current applications, which may require thousands of amperes of current. Thus, the direct self-drive scheme is not suitable for many such applications.

SUMMARY OF INVENTION

Generally speaking the present invention fulfills the foregoing needs by providing a power converter using a switching signal having at least three levels of amplitude. One of such amplitude levels has a zero amplitude level at least during a predetermined switching interval. The power converter is made up of a transformer core electromagnetically coupled to respective primary and secondary windings. The core is excited by the primary winding so that the secondary winding generates the switching signal.

The power converter includes a circuit module having first and second input terminals for receiving the switching signal. The circuit module in turn is made up of a first power transistor having respective gate, drain and source terminals. The drain terminal of the first power transistor is coupled to the first input terminal of the circuit module, and the gate terminal of the first power transistor is coupled to the second input terminal of the circuit module. A second power transistor has respective gate, drain and source terminals. The drain terminal of the second power transistor is coupled to the second input terminal of the circuit module, and the gate terminal of that second power transistor is coupled to the first input terminal of the circuit module. The respective source terminals of the first and second power transistors are mutually coupled to one another.

Circuit means is coupled to a predetermined one of the power transistors. The circuit means is configured for substantially maintaining a predetermined voltage level across the gate terminal of the predetermined one of the power transistors at least during the switching interval of substantially zero amplitude. The predetermined voltage level is chosen to enable that predetermined power transistor to continue in a respective "on" state notwithstanding of the presence of such switching interval of substantially zero amplitude. The circuit means is further configured for removing the predetermined voltage upon termination of the switching interval of substantially zero amplitude level to enable the predetermined power transistor to transition to a respective "off" state.

The foregoing power converter may be conveniently used to extend a self-driving SR technique to a broader range of output voltages and circuit topologies, including, as suggested above, converters whose transformer winding voltage has a zero state in one portion of a switching period. The power converter of the present invention further provides over-voltage protection to the SR's gates, and the capability to directly parallel additional modules.

BRIEF DESCRIPTION OF THE DRAWINGS

FIG. 1(a) shows a two output inductor rectifier circuit, FIG. 1(b) shows a one output inductor rectifier circuit, and FIG. 1(c) shows a general configuration not referring to any specific number of output inductors.

FIGS. 5(a)–5(d) collectively show a power converter system using a circuit module in accordance with one exemplary embodiment of the present invention: FIG. 5(a) shows a simplified schematic of the circuit module that in accordance with the present invention allows for efficiently driving power transistors coupled to receive a switching waveform that may have a zero voltage state. FIG. 5(b) shows exemplary waveforms used in the circuit of FIG. 5(a). FIG. 5(c) shows the power converter of FIG. 5(a) coupled to an exemplary primary input stage using a two-switch forward circuit for driving the converter. FIG. 5(d) shows exemplary waveforms used in the power converter shown in FIG. 5(c).

FIGS. 6(a)–6(f) collectively show exemplary schematics and waveform plots for illustrating operational states of the circuit module shown in FIG. 5. FIG. 6(a) shows a conceptual circuit schematic of a gate capacitance of an SR coupled to an auxiliary inductor while the gate voltage therein decays to zero. FIG. 6(b) shows a simplified schematic of the circuit state shown in FIG. 6(a). FIG. 6(c) shows exemplary waveforms used in connection with the circuit of FIG. 6(a). FIG. 6(d) shows another conceptual circuit schematic when the auxiliary inductor of FIG. 6(a) is reset by the secondary side switching waveform. FIG. 6(e) shows a simplified schematic of the circuit state shown in FIG. 6(d). FIG. 6(f) shows exemplary waveforms used in connection with the circuit of FIG. 6(d).

FIG. 8 shows experimentally derived waveforms wherein: FIG. 8(a) shows a respective plot for a power converter using the prior art direct self-driving circuit of FIG. 3; while FIG. 8(b) shows a respective plot for a circuit module in accordance with the present invention.

FIGS. 10(a)–10(d) collectively show two exemplary embodiments and respective waveform plots for a circuit module of the present invention that conveniently allows for eliminating the resonant inductor shown in FIGS. 5 and 6.

FIGS. 12(a)–12(d) collectively show yet another exemplary embodiment of a power converter in accordance with the present invention that conveniently allows operation of the converter in relatively low voltage applications: FIG. 12(a) shows one embodiment of a circuit module with respective windings directly coupled to a transformer secondary winding. FIG. 12(b) shows exemplary waveforms used in connection with the circuit module shown in FIG. 12(a). FIG. 12(c) shows another embodiment of a circuit module wherein the respective windings bypass the transformer secondary winding. FIG. 12(d) shows exemplary waveforms used in connection with the circuit module shown in FIG. 12(c).

FIGS. 13(a)–13(d) collectively show still another exemplary embodiment of the power converter in accordance with the present invention that results from combining the innovative features embodied in FIGS. 5, 10 and 12: FIG. 13(a) shows a schematic illustrating circuit details in connection with the combination of the inventive features shown in FIGS. 5 and 12. FIG. 13(b) shows exemplary waveforms used in connection with the circuit of FIG. 13(a). FIG. 13(c) shows a schematic illustrating circuit details in connection with the combination of the inventive features shown in FIGS. 10 and 12. FIG. 13(d) shows exemplary waveforms used in connection with the circuit of FIG. 13(c).

DETAILED DESCRIPTION OF THE INVENTION

Figure 3:
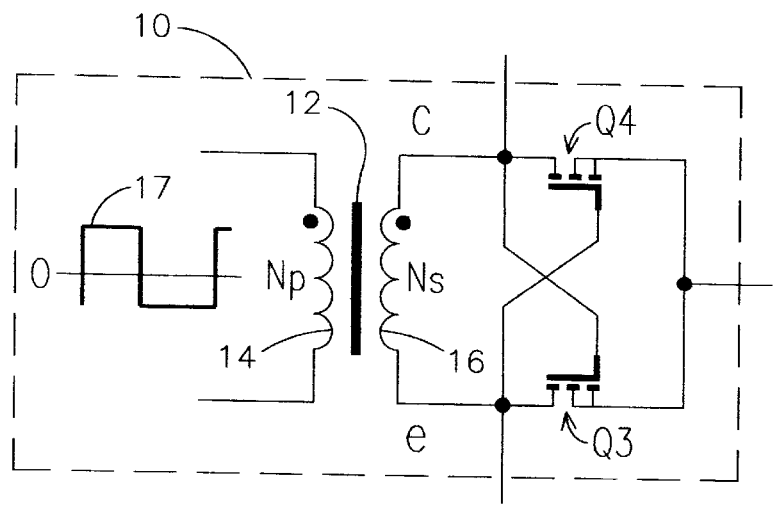
FIG. 3 shows another prior art power converter configured for direct self-driving of the synchronous rectifiers therein.
Figure 4:
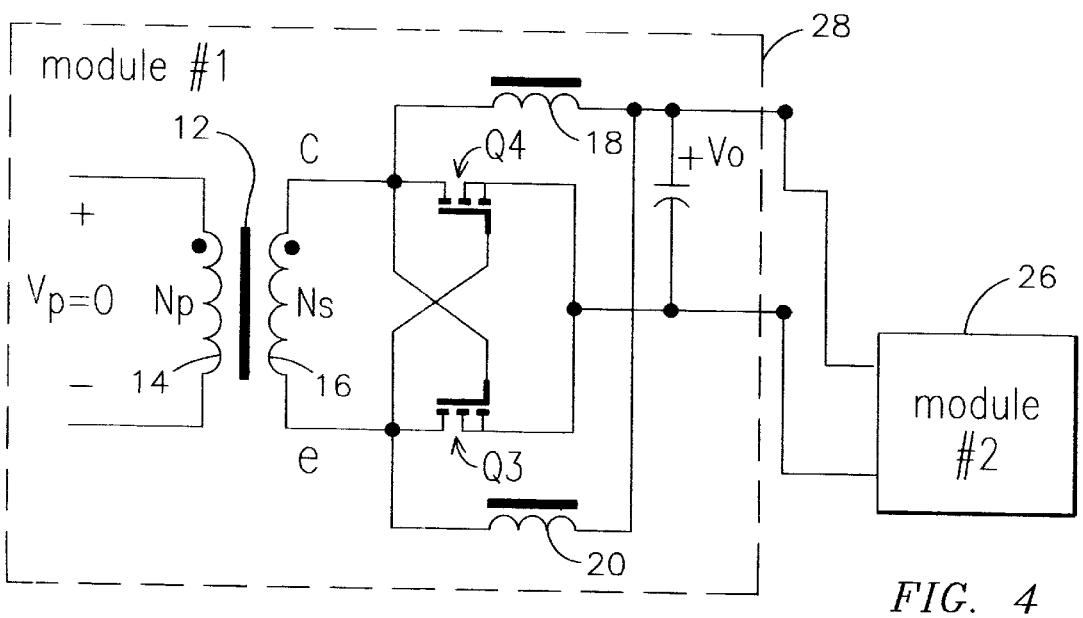
FIG. 4 shows in part a simplified block diagram of a desirable power converter architecture for parallel coupling of multiple power converter modules, however, such architecture cannot be provided by the prior art circuit configuration of FIG. 3.

For power converters whose transformer secondary switching signal may have a zero amplitude state, at least during a predetermined switching interval, the direct self-drive scheme described above in the context of FIGS. 3 and 4 is not suitable. For example, in a power converter 100 coupled to a two-switch forward circuit 102 as shown in FIG. 5(b), after transformer core 12 is substantially reset, a switching signal $V_s$ on transformer secondary winding 16 substantially drops to zero amplitude and, presuming that the prior art direct self-driving circuit shown in FIG. 3 were to be used in lieu of a circuit module 104 in accordance with the present invention, power transistor Q4 would temporarily lose its gate drive signal. During that interval of zero amplitude, a body diode (not shown) of power transistor Q4 would have to pick up the load current, and thus adversely increase the conduction loss and the reverse recovery loss in the body diode of power transistor Q4.

At a relatively low duty cycle or a relatively high input voltage, this increased loss may become unacceptable. To overcome the problem, circuit module 104 using a hybrid gate drive scheme in accordance with the present invention is proposed, as shown in FIG. 5. Circuit module 104 conveniently uses the transformer secondary switching signal (e.g., $V_s$ signal) to charge a gate capacitance of, for example, power transistor Q4 through a suitable diode e.g., diode Dg1. It will be appreciated that after transformer core 12 is fully reset and its secondary voltage drops to zero, diode DG1 will conveniently turn off and thus maintain or sustain the gate voltage of power transistor Q4. The MOSFET portion of the power transistor Q4 will then continue its conduction of the load current even when $V_s \cong 0$, that is, power transistor Q4 will continue to be in a substantially on state notwithstanding that the secondary winding voltage may have an amplitude substantially equal to zero during some measurable switching interval. Conversely, upon completion of such zero amplitude state, the gate voltage of power transistor Q4 will have to be suitably discharged to enable power transistor Q4 to transition into a respective substantially off state while power transistor Q3 transitions into a respective substantially on state. The discharging may be completed by cooperative interaction of a gating transistor Qa having suitable terminals, such as collector, base and emitter terminals, respectively designated by the letters C, B and E, and a relatively small resonant or auxiliary inductor $L_d$. The gate-on signal of gating transistor Qa preferably leads the turn-on signals of the primary side MOSFETs Q1 and Q2 by a predetermined lead time $t_d$, as indicated in the respective waveform plots shown in FIGS. 5(b) and 5(d).

As will be appreciated by those skilled in the art of power electronics, there are two operational stages that are used in the discharging procedure. By way of example and not of limitation, the two-switch forward circuit will be used as the illustrative embodiment in the following discussion. For the sake of simplicity of illustration, in FIG. 6, the primary side circuit of the two-switch forward converter is not shown.

Figure 6A:
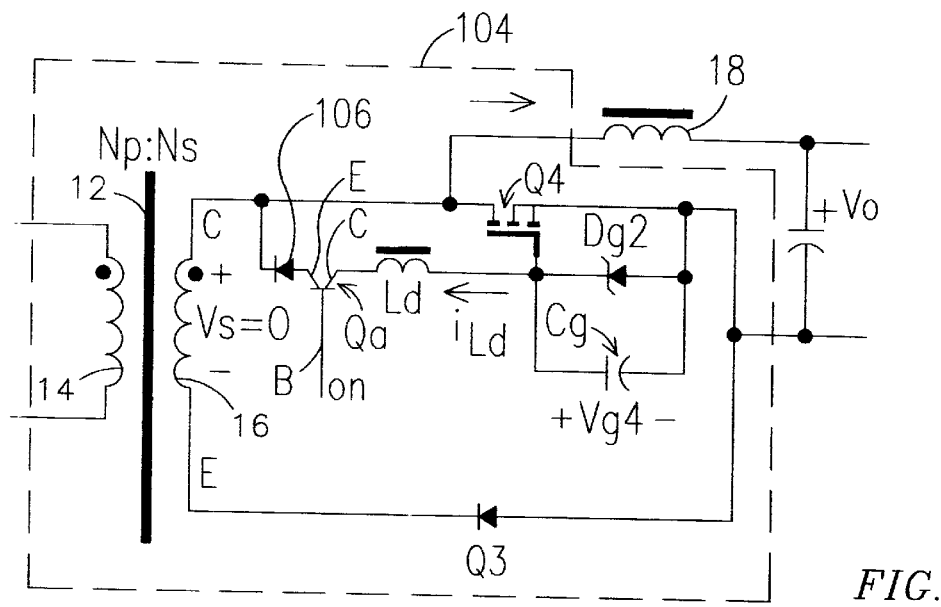
Figure 6B:
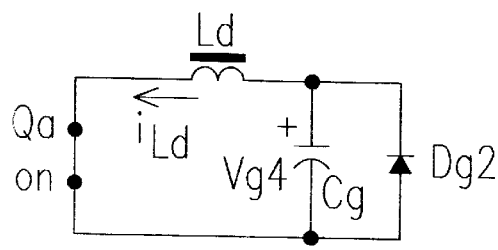

First Operational State
Discharging of Gate Capacitor $C_g$, as Shown in FIGS. 6(a)–6(c)

Presuming gating transistor Qa is turned on in response to the gating signal applied to its respective base terminal B, since switching signal $V_s$ is still substantially zero, inductor $L_d$ resonates with a gate capacitance $C_g$ of power transistor Q4 to bring down essentially to zero a voltage $V_{g4}$ across the gate terminal G of power transistor Q4. After capacitor $C_g$ is substantially discharged and power transistor Q4 is in a substantially off state, diode Dg2 starts to conduct. Then the primary-side switching signals can be turned on without causing undesirable cross-conduction between power transistors Q3 and Q4. The minimum lead time $t_d$ between the rising edges of Qa and $V_s$ is conveniently determined by $$t_d = \frac{\pi}{2}\sqrt{L_d C_g} \qquad \text{Eq. 1}$$

where $C_g$ represents the gate capacitance of power transistor Q4 and $L_d$ represents the inductive value of the resonating inductor. At the end of this stage, the energy initially stored in capacitor $C_g$ is transferred to inductor $L_d$. In actual practice, the gating signal applied to the base terminal of transistor Qa can be readily designed to lead the primary switching signals Q1,2 by time $t_d$ to ensure substantial discharge of the gate capacitance of power transistor Q4.

Figure 6D:
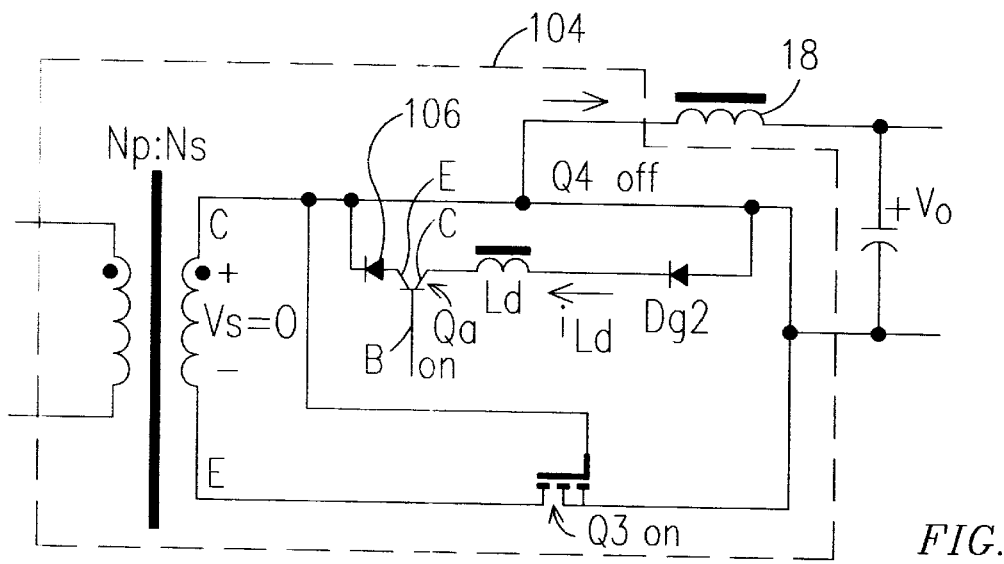
Figure 6E:
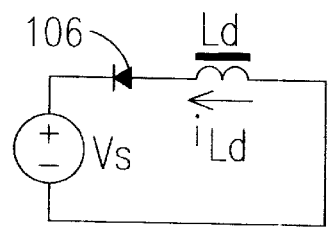

Second Operational State
Reset of Inductor $L_d$, as Shown in FIGS. 6(d)–6(f)

As switching signal $V_s$ rises from zero amplitude to amplitude $V_{sp}$ (due to the turn-on of the primary side switches), a current $i_{Ld}$ in inductor $L_d$ decreases substantially linearly at a rate determined by the ratio of $V_{sp}/L_d$ returning the stored energy to the output. After the current in inductor $L_d$ decreases to zero, a diode 106 coupled in series with transistor Qa prevents current reversal in inductor $L_d$. Transistor Qa can then be readily turned off. The minimum reset time $t_r$ of inductor $L_d$ is estimated as $$t_r = \sqrt{L_d C_g}\,\frac{V_{sn}}{V_{sp}}, \qquad \text{Eq. 2}$$

where $V_{sn}$ and $V_{sp}$ represent the negative and positive amplitudes of switching signal $V_s$, respectively.

Figure 7:
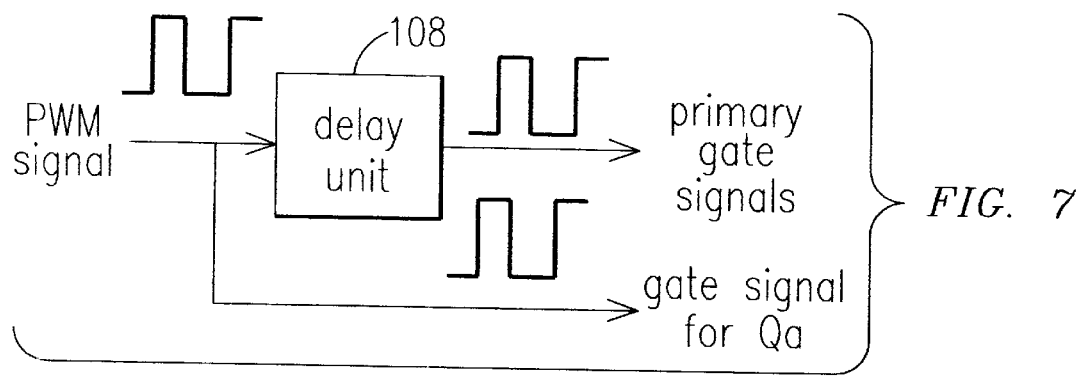
FIG. 7 shows a simplified block diagram for generating a gating signal that may be used in the circuit module shown in FIGS. 5 and 6.

As shown in FIG. 7, the generation of the gating signal applied to the base terminal B of transistor Qa may be easily realized by use of a simple delay unit 108. By way of example, transistor Qa may be electrically coupled to receive its respective gating signal through base terminal B directly from a suitable integrated circuit chip (not shown) using well-known modulation techniques, such as pulse width modulation (PWM) techniques and the like to produce, for example, a PWM signal that may be delayed by time $t_d$ at the turn-on or both turn-on and turn-off before it is fed into the gates of the primary side switches Q1 and Q2.

A two-switch forward converter prototype was constructed and tested to verify the proposed technique. The input voltage was about 48 V, the output voltage was about 1.2~1.65 V. The output current was about 60 A. Each of the SRs employed SUP75N03-04 MOSFETs electrically coupled in parallel. Resonating inductor $L_d$ was made up of a MPP55025-A2 inductor with 2 turns of wire with a gauge of AWG#26. The inductance was measured to be about 0.4 uH.

Figure 8A:
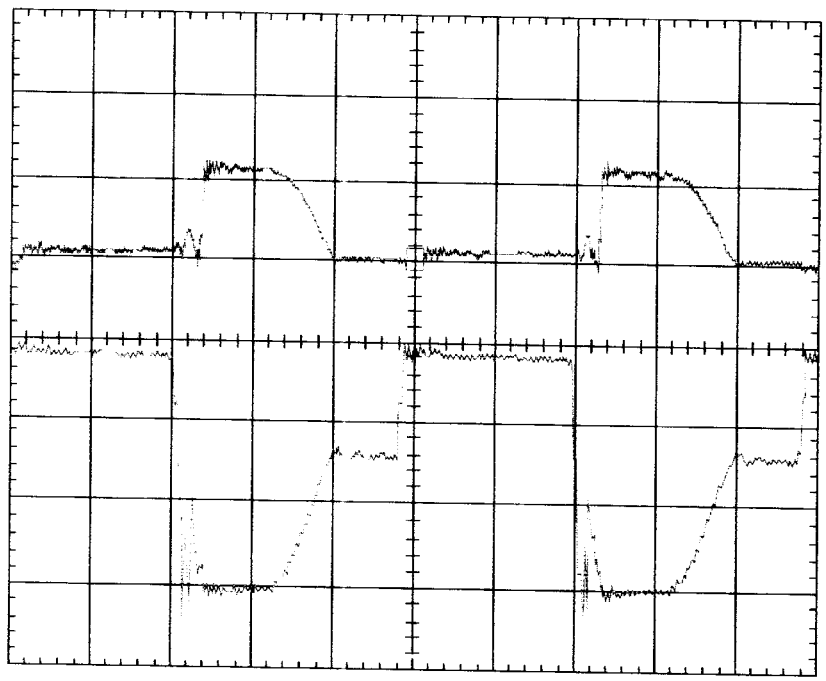
Figure 8A:
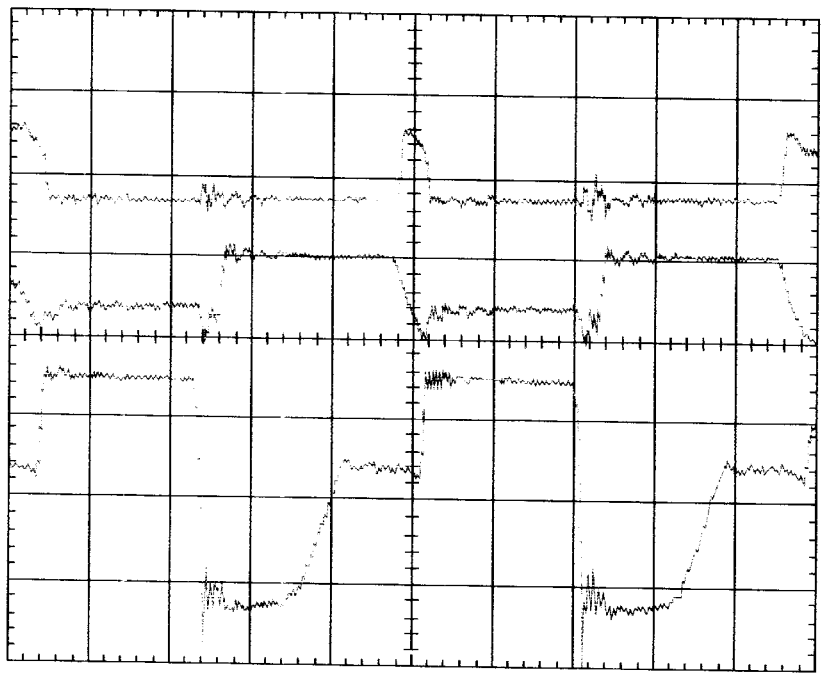
Figure 9:
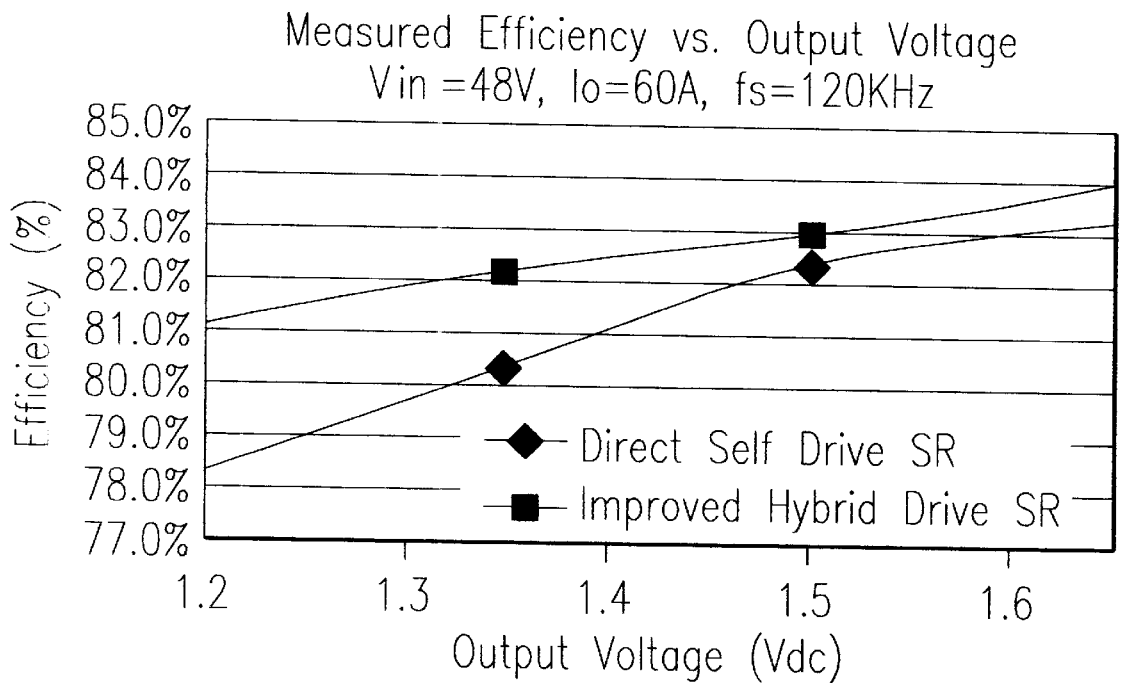
FIG. 9 show a plot illustrating respective power efficiencies of a power converter using a prior art circuit and a power converter using a circuit module in accordance with the present invention.

As will be appreciated by those skilled in the art, the experimentally derived waveforms shown in FIG. 8 readily demonstrate that the circuit of the present invention is able to provide a substantially undistorted gate-driving waveform to the freewheeling SR (Q4) after the transformer reset is complete. At a lower duty cycle, the present invention provides even better efficiency than the direct self-driven synchronous rectification technique. This can be verified from the efficiencies shown in FIG. 9. Since as discussed above, this scheme uses control circuit timing to discharge the gate capacitance of the freewheeling SR and also uses the direct self-drive concept, it may be referred as a hybrid gate-drive scheme for synchronous rectifiers.

Figure 10A:
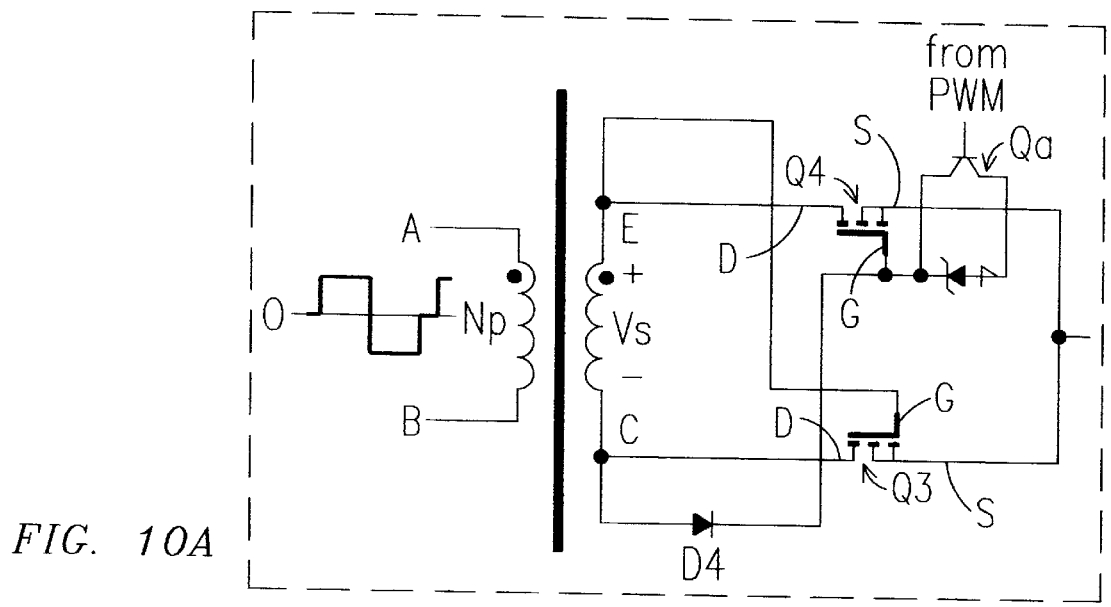
Figure 10C:
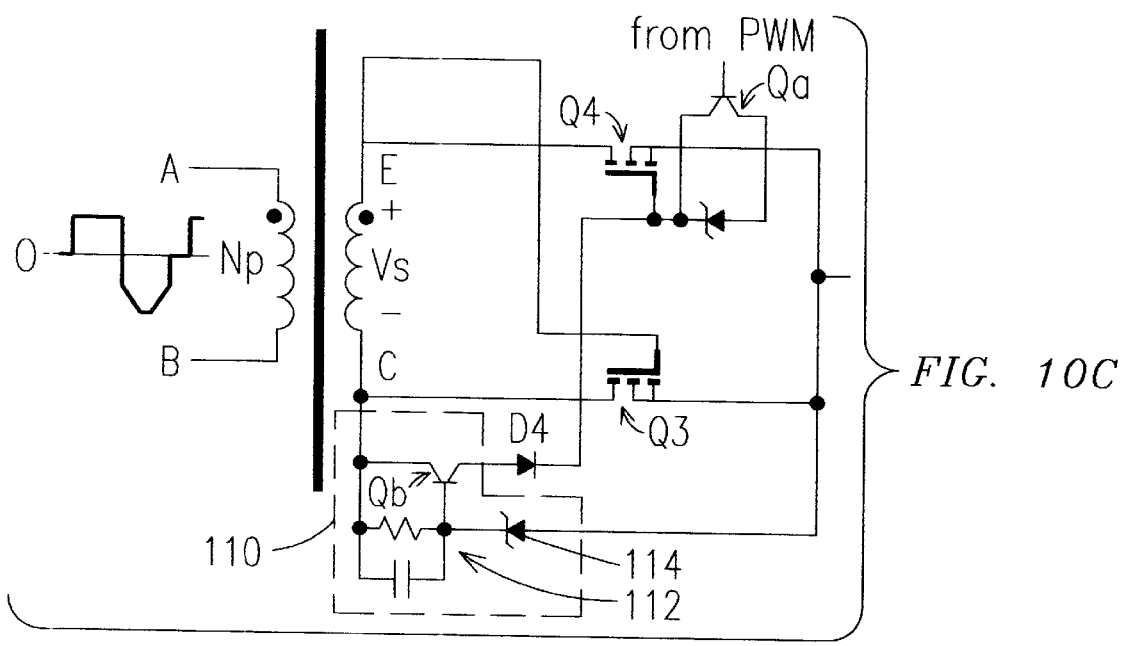

It will be appreciated that in situations wherein the gate capacitance of power transistor Q4 is not relatively high, the gate charge of power transistor Q4 may be dissipated directly in the gating transistor Qa. As shown in FIGS. 10(*a*) and 10(*b*), if transistor Qa turns on just before primary-side switches Q1 and Q2 turn on and presuming the turn-on speed of transistor Qa is sufficiently fast, the discharge of the gate capacitance of power transistor Q4 can be done essentially instantaneously. Further, in this embodiment there may be no need for a delay time $t_d$ between the rising edge of primary side signals Q1,2 and setting signal Qa. It will be appreciated that compared to the embodiment discussed in the context of FIGS. 5 and 6, the embodiment of FIG. 10(*a*) would require fewer components and possibly a relatively simpler control circuit and thus the cost would be lowered.

For some converter topologies, the reset voltage of the transformer may be too high to be directly coupled to the gate of power transistor Q4 through diode D4, e.g., the resonant reset forward topology. In this case as shown in FIG. 10(*c*), a circuit submodule 110 having a buffer transistor Qb can be inserted to conveniently drop a portion of the voltage waveform, as shown in FIG. 10(*d*). As shown in FIG. 10(*c*), circuit submodule 110 may conveniently include a signal conditioning RC network 112 and a zener diode 114 coupled to the respective gating terminal of transistor Qb.

In another embodiment, in order to protect the gates of the SRs from over-voltage conditions, as will be now appreciated from the teachings of the present invention, one could use a Zener diode in parallel with the gate-to-source of power transistors Q3 and Q4. However, it would be desirable to insert a suitable impedance between the Zener diode and the driving point of the transformer secondary winding, otherwise a high surge current might damage the Zener diode. Further, if the impedance were chosen to be purely resistive, the charging and discharging current of the gate capacitance would generate a not necessarily insignificant power loss on that purely impedance. Also, because the gate capacitance is usually relatively large, even a small value of that resistive impedance could cause a significant delay at turn-off of the synchronous rectifier, resulting in undesirable cross-conduction of the SRs during the switching transients.

Figure 11:
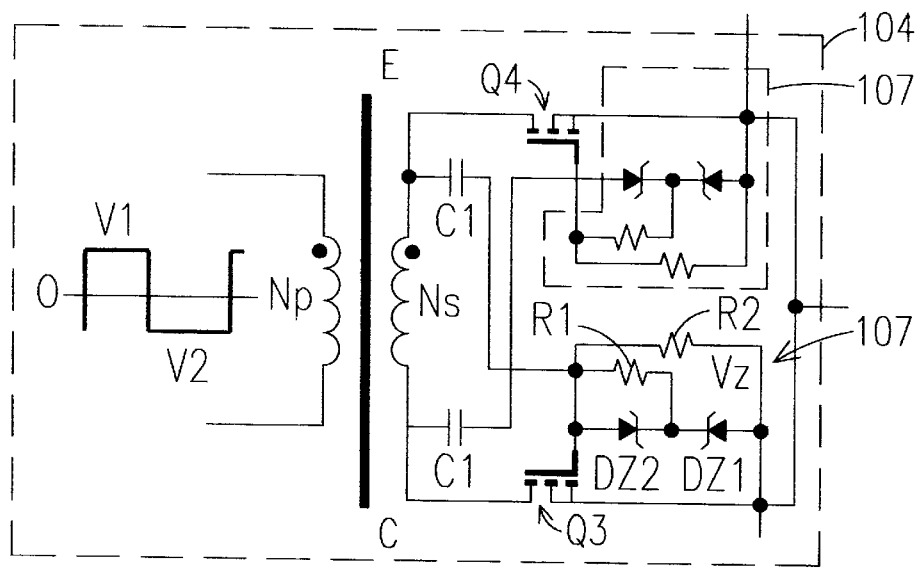
FIG. 11 shows another embodiment of the circuit module in accordance with the present invention that allows for parallel coupling of multiple power converter modules and further protects the respective SRs therein from power surge conditions.

Therefore, to overcome such difficulties, a capacitor ($C_1$) is employed together with Zener diodes (DZ1 and DZ2) to protect the gates of the MOSFET from suffering damage during over-voltage conditions, as shown FIG. 11. If a single resistor were to be paralleled with capacitor $C_1$ to maintain the charge balance on capacitor $C_1$, this could allow the output voltage of the converter to be dc-coupled into the respective gates of the power transistors. So a first resistor, such as charge-balance resistor R1, is placed across diode DZ2 instead, as shown in FIG. 11. Further a second resistor R2 is placed across the gate and source of the power transistor to ensure that no dc voltage will build up on the respective gate of that power transistor when the converter is not operating. Thus, the circuit module implementation shown in FIG. 11, conveniently includes a circuit submodule 107 that in addition to protecting the power transistors during power surge conditions, conveniently and advantageously allows the direct parallel coupling of several converter modules, as discussed in the context of FIG. 4. Although in the foregoing discussion for the sake of simplicity of description only the circuit submodule coupled to power transistor Q4 is specifically made reference to, it will be apparent that another circuit submodule may be readily coupled to power transistor Q3 essentially for the same purposes described above.

It is noted that in some applications, the respective positive or negative amplitudes of switching signal $V_s$ are generally constant and much lower than the gate breakdown voltage. In such situations diodes DZ1 or DZ2 in FIG. 11 can be respectively replaced by standard diodes, i.e., non-Zener diodes. Further, since the implementation shown in FIG. 11 readily clamps the voltage peak of the gate drive voltage, such implementation may conveniently be applied to a converter using a non-square-wave transformer voltage, for example, a resonant reset forward converter.

It will be appreciated that for a duty cycle of about 50%, the amplitude of the transformer secondary voltage is about twice the output voltage of the converter. For a logic gate MOSFET, a proper gate drive voltage is generally in a range of about 6–12 V; for a regular gate MOSFET, the proper gate drive voltage is generally in a range of about 10–16 V. Thus, if the output voltage of the converter is lower than about 3 V, for example, about 1.8 V, the prior art direct self-drive scheme shown in FIG. 3 would be useless.

To boost the gate-driving voltage for the SRs, separate gate-drive windings 110 and 112 having respective turns N1 and N2 are electrically coupled, as shown in FIG. 12. Respective turns N1 and N2 are thus conveniently chosen to obtain a proper gate-drive voltage. As shown in FIG. 12, there may two alternative embodiments to accomplish such signal boosting. In the one embodiment shown in FIG. 12(*a*), winding 110 and 112 are electromagnetically coupled directly to secondary power winding 16. In the other embodiment shown in FIG. 12(*b*), windings 110 and 112 bypass power winding 16 and are respectively coupled directly to the gate terminal of power transistors Q3 and Q4. Consequently, as shown in the respective waveform plots of FIGS. 12(*b*) and 12(*d*), for a given amplitude of the positive gate voltage, the amplitude of the negative gate voltage in the embodiment of FIG. 12(*a*) is smaller than that obtained in the embodiment of FIG. 12(*c*). Further, in general, the power loss associated with the gate driving embodiment of FIG. 12(*a*) may be lower than the embodiment of FIG. 12(*c*) and moreover the embodiment of FIG. 12(*a*) usually needs fewer windings N1 and N2 turns for the same amplitude of positive gate voltage. Thus, in view of the foregoing considerations, having the windings 110 and 112 directly coupled to the power winding is usually preferred to such windings bypassing the power winding.

Figure 1A:
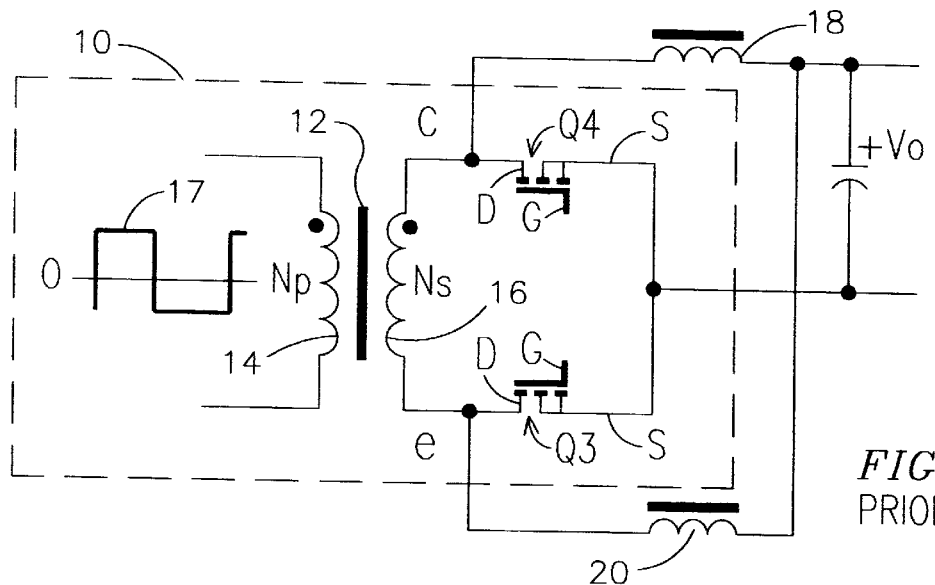
FIGS. 1(a)–1(c) each shows a respective schematic of prior art power converters using synchronous rectifiers.
Figure 1B:
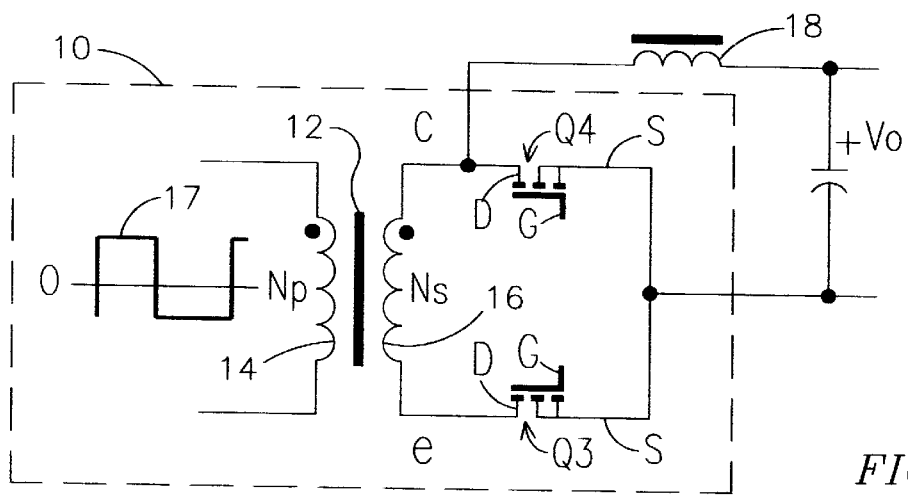
Figure 1C:
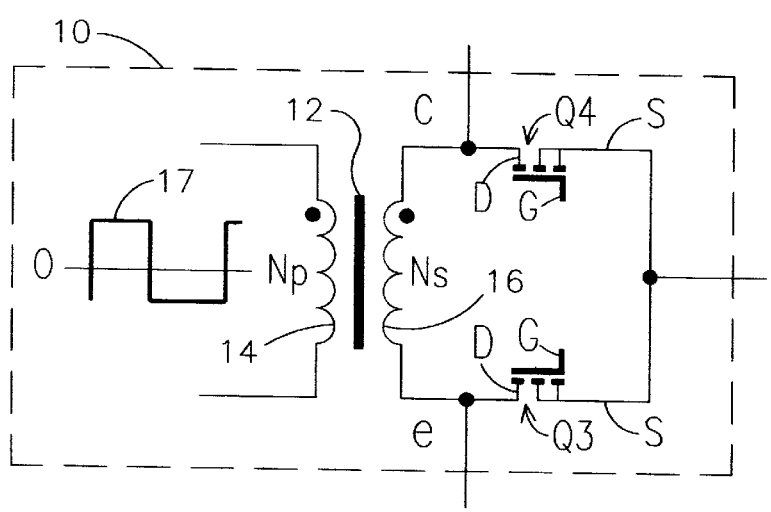
Figure 2:
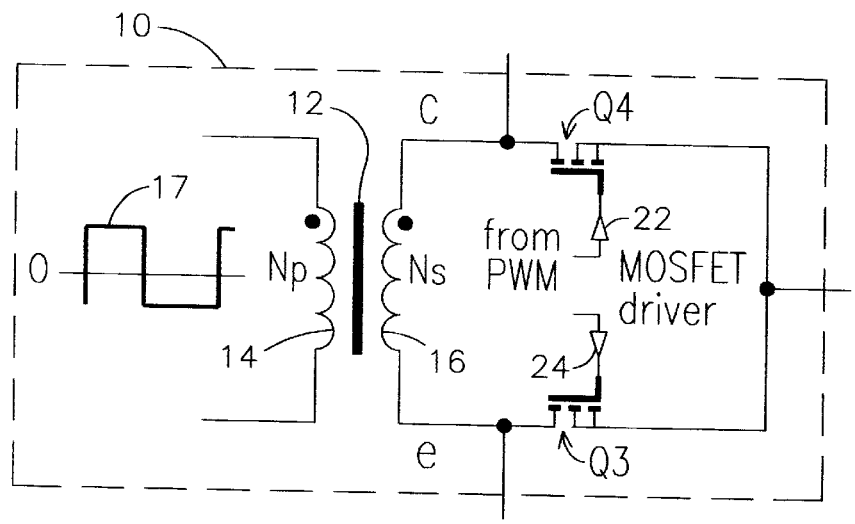
FIG. 2 shows one prior art power converter configured for external driving of the synchronous rectifiers therein.
Figure 13A:
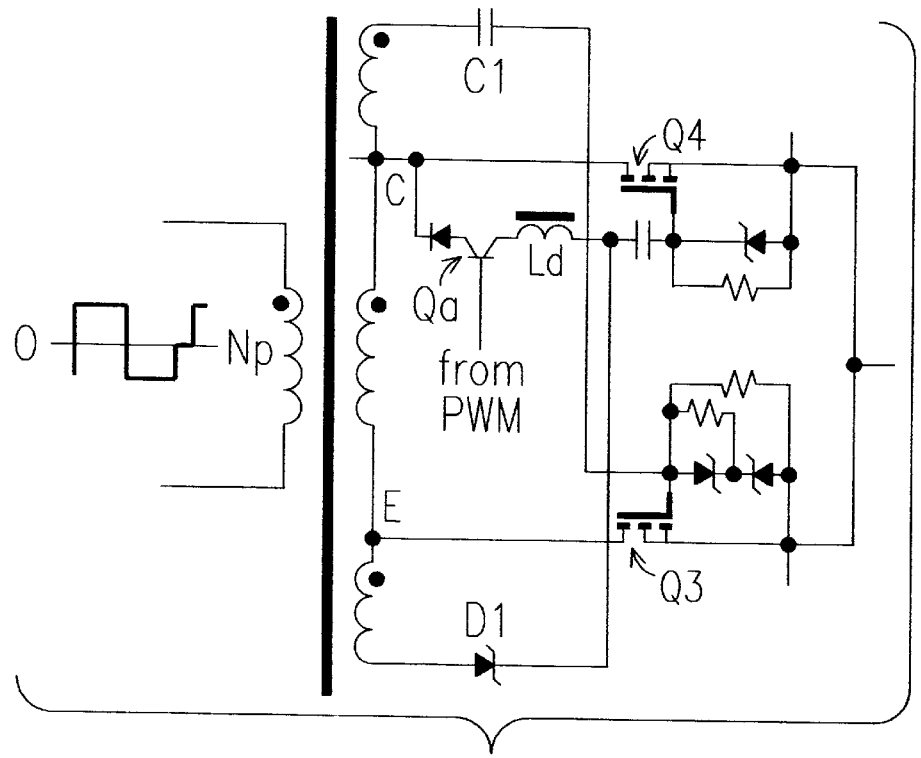
Figure 13C:
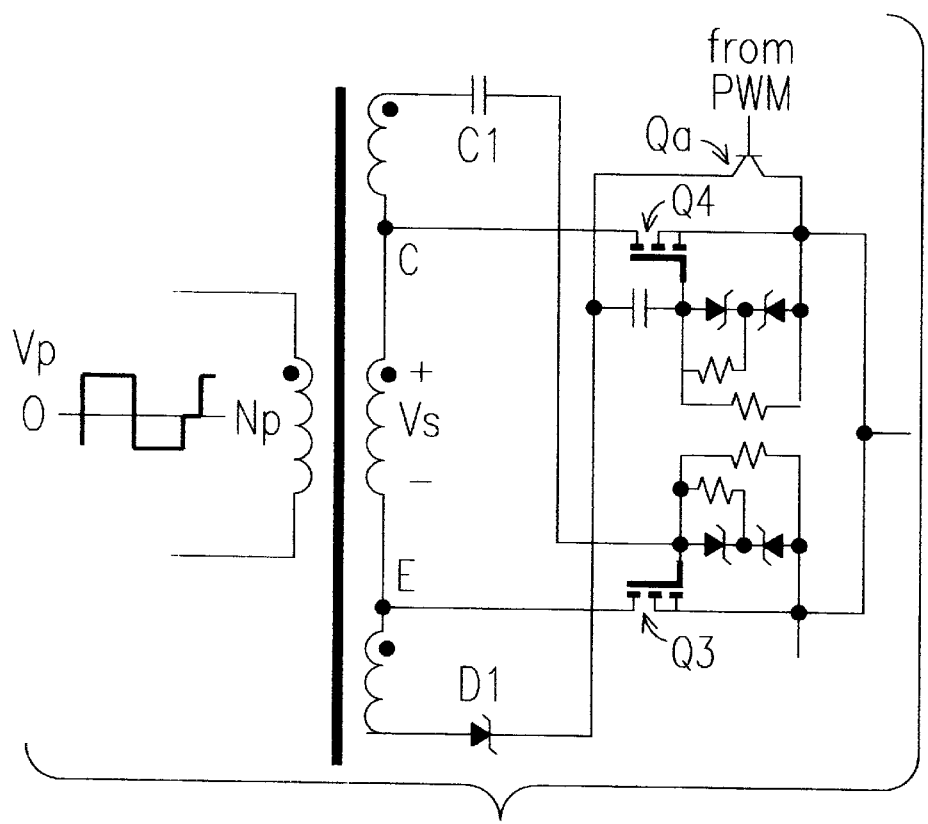

FIG. 13 shows respective embodiments that conveniently incorporate the features discussed in the context of FIGS. 5, 10, 11 and 12, and that enable the power converter to simultaneously provide voltage protection to the gate of the power transistors therein and parallel module operation for circuits whose secondary transformer voltage has a zero state. Two versions are shown: FIGS. 13(a) and 13(b) show the combination that results from incorporating the features more specifically discussed in the context of FIGS. 5, 11 and 12 and that conveniently allows the converter to operate with lossless discharge. FIGS. 13(c) and 13(d) show the combination that results from incorporating the features more specifically discussed in the context of FIGS. 10, 11 and 12 and that conveniently allows for elimination of the resonant inductor Qa. As will be appreciated by those skilled in the art of power electronics either of which combinations can be advantageously applied with or without drive windings to the one-inductor, two-inductor, or center-tapped secondary circuits discussed in the context of FIG. 1.

What is claimed is:

1. In a DC-to-DC power converter generally having a transformer core electromagnetically coupled to respective primary and secondary windings, and wherein the transformer core is excited in response to a predetermined input signal received at the primary winding so that the secondary winding generates a switching signal having multiple levels of amplitude including, at least during a predetermined switching interval, an amplitude level corresponding to substantially zero amplitude, a first circuit module comprising:

first and second input terminals for receiving the switching signal;

a first power transistor having respective gate, drain and source terminals, the drain terminal of said first power transistor coupled to the first input terminal of the circuit module, the gate terminal of said first power transistor coupled to the second input terminal of the circuit module;

a second power transistor having respective gate, drain and source terminals, the drain terminal of said second power transistor coupled to the second input terminal of the circuit module, the gate terminal of that second power transistor coupled to the first input terminal of the circuit module, and the respective source terminals of the first and second power transistors being mutually coupled to one another; and circuit means coupled to a predetermined one of the power transistors, the circuit means configured for substantially maintaining a predetermined voltage level across the gate terminal of the predetermined one of the power transistors at least during said switching interval of substantially zero amplitude, said predetermined voltage level being chosen to enable that predetermined power transistor to continue in a respective "on" state notwithstanding the presence said switching interval of substantially zero amplitude, said circuit means further configured for removing said predetermined voltage level upon termination of said switching interval of substantially zero amplitude to enable said predetermined power transistor to transition to a respective "off" state.

2. The circuit module of claim 1 wherein the circuit means comprises a gating transistor having respective emitter, collector and base terminals, the collector terminal of said transistor coupled to the gate terminal of the predetermined one of the power transistors, the emitter terminal coupled to the source terminal of the other power transistor, and the base terminal of said gating transistor coupled to receive a predetermined gating signal.

3. The circuit module of claim 2 wherein the circuit means further comprises a first diode having respective anode and cathode terminals, the cathode terminal of said first diode coupled to the gate terminal of the predetermined power transistor, and the anode terminal of said first diode coupled to the circuit module input terminal being coupled through said first diode to the gate terminal of said predetermined power transistor.

4. The circuit module of claim 3 wherein the circuit means further comprises a second diode having respective anode and cathode terminals, the anode terminal of said second diode coupled to the source terminal of the predetermined power transistor, and the cathode terminal of said second diode coupled to the gate terminal of the predetermined power transistor.

5. The circuit module of claim 4 wherein the second diode comprises a Zener diode.

6. The circuit module of claim 1 wherein the circuit means comprises:

an inductor having two terminals, one terminal of said inductor coupled to the gate terminal of the predetermined power transistor;

a gating transistor having respective emitter, collector and base terminals, the collector terminal of the gating transistor coupled to the other terminal of the inductor, and the base terminal of said gating transistor coupled to receive a predetermined gating signal;

a first diode having respective anode and cathode terminals, the cathode terminal of said first diode coupled to the gate terminal of the predetermined power transistor, and the anode terminal of said first diode coupled to the circuit module input terminal coupled through said first diode to the gate terminal of said predetermined power transistor;

a second diode having respective anode and cathode terminals, the anode terminal of said second diode coupled to the source terminal of the predetermined power transistor, and the cathode terminal of said second diode coupled to the gate terminal of the predetermined power transistor; and a third diode having respective anode and cathode terminals, the anode terminal of said third diode coupled to the emitter terminal of the gating transistor, and the cathode terminal of said third diode coupled to the input terminal of the circuit module coupled to the drain terminal of the predetermined power transistor.

7. The circuit module of claim 6 wherein the second diode comprises a Zener diode.

8. The circuit module of claim 7 further comprising a delay unit coupled to introduce, relative to the predetermined gating signal applied to the gating transistor, a predetermined delay time in the switching signal.

9. The circuit module of claim 8 wherein each transition from a logic zero to a logic one of the predetermined gating signal applied to the gating transistor precedes a corresponding transition in the switching signal by said predetermined delay time interval.

10. The circuit module of claim 6 further comprising a circuit sub-module for substantially protecting the power transistors in the event of an electrical power surge.

11. The circuit module of claim 10 further comprising respective winding means for sufficiently increasing the amplitude of the switching signal to enable said first and second power transistors to effectively switch from each respective on state to each respective off state and vice versa, independently of whether the converter is configured to supply a relatively low-voltage output signal.

12. The circuit module of claim 11 wherein said respective winding means comprises a separate winding coupled in series to each side of the secondary winding.

13. The circuit module of claim 11 wherein said respective winding means bypasses said secondary winding and comprises a separate winding directly coupled to each respective gate terminal of the first and second power transistors.

14. The circuit module of claim 10 wherein the circuit sub-module includes circuit interface means for electrically interconnecting additional circuit modules to the first circuit module to increase current rating of the power converter without causing undesirable electrical cross-coupling among the first circuit module and the additional circuit modules.

15. The circuit module of claim 4 further comprising a circuit sub-module for substantially protecting the circuit module in the event of an electrical power surge.

16. The circuit module of claim 15 further comprising respective winding means for sufficiently increasing the amplitude of the switching signal to enable said first and second power transistors to effectively switch from each respective on state to each respective off state and vice versa, independently of whether the converter supplies a relatively low-voltage output signal.

17. The circuit module of claim 16 wherein the circuit sub-module includes circuit interface means for electrically interconnecting additional circuit modules to the first circuit module to increase current rating of the power converter without causing undesirable electrical cross-coupling among the first circuit module and the additional circuit modules.

18. A power converter using a switching signal having at least ternary levels of amplitude, one of said ternary levels having an amplitude level of substantially zero amplitude at least during a predetermined switching interval, said power converter comprising:
a transformer core electromagnetically coupled to respective primary and secondary windings, said core being excited by said primary winding so that the secondary winding generates said switching signal;
a circuit module having first and second input terminals for receiving the switching signal, said circuit module in turn comprising:
a first power transistor having respective gate, drain and source terminals, the drain terminal of said first power transistor coupled to the first input terminal of the circuit module, the gate terminal of said first power transistor coupled to the second input terminal of the circuit module;
a second power transistor having respective gate, drain and source terminals, the drain terminal of said second power transistor coupled to the second input terminal of the circuit module, the gate terminal of that second power transistor coupled to the first input terminal of the circuit module, and the respective source terminals of the first and second power transistors being mutually coupled to one another; and
circuit means coupled to a predetermined one of the power transistors, the circuit means configured for substantially maintaining a predetermined voltage level across the gate terminal of the predetermined one of the power transistors at least during said switching interval of substantially zero amplitude, said predetermined voltage level being chosen to enable that predetermined power transistor to continue in a respective "on" state notwithstanding the presence said switching interval of substantially zero amplitude, said circuit means further configured for removing said predetermined voltage upon termination of said switching interval of substantially zero amplitude level to enable said predetermined power transistor to transition to a respective "off" state.

19. The power converter of claim 18 wherein the circuit means comprises a gating transistor having respective emitter, collector and base terminals, the collector terminal of said transistor coupled to the gate terminal of the predetermined one of the power transistors, the emitter terminal coupled to the source terminal of the other power transistor, and the base terminal of said gating transistor coupled to receive a predetermined gating signal.

20. The power converter of claim 19 wherein the circuit means further comprises a first diode having respective anode and cathode terminals, the cathode terminal of said first diode coupled to the gate terminal of the predetermined power transistor, and the anode terminal of said first diode coupled to the circuit module input terminal being coupled through said first diode to the gate terminal of said predetermined power transistor.

21. The power converter of claim 20 wherein the circuit means further comprises a second diode having respective anode and cathode terminals, the anode terminal of said second diode coupled to the source terminal of the predetermined power transistor, and the cathode terminal of said second diode coupled to the gate terminal of the predetermined power transistor.

22. The power converter of claim 21 wherein the second diode comprises a Zener diode.

23. The power converter of claim 18 wherein the circuit means comprises:
an inductor having two terminals, one terminal of said inductor coupled to the gate terminal of the predetermined power transistor;
a gating transistor having respective emitter, collector and base terminals, the collector terminal of the gating transistor coupled to the other terminal of the inductor, and the base terminal of said gating transistor coupled to receive a predetermined gating signal;
a first diode having respective anode and cathode terminals, the cathode terminal of said first diode coupled to the gate terminal of the predetermined power transistor, and the anode terminal of said first diode coupled to the circuit module input terminal coupled through said first diode to the gate terminal of said predetermined power transistor;
a second diode having respective anode and cathode terminals, the anode terminal of said second diode coupled to the source terminal of the predetermined power transistor, and the cathode terminal of said second diode coupled to the gate terminal of the predetermined power transistor; and
a third diode having respective anode and cathode terminals, the anode terminal of said third diode coupled to the emitter terminal of the gating transistor, and the cathode terminal of said third diode coupled to the input terminal of the circuit module coupled to the drain terminal of the predetermined power transistor.

24. The power converter of claim 23 wherein the second diode comprises a Zener diode.

25. The power converter of claim 19 further comprising a delay unit coupled to introduce, relative to the predetermined gating signal applied to the gating transistor, a predetermined delay time in the switching signal.

26. The power converter of claim 25 wherein each transition from a logic zero to a logic one of the predetermined gating signal applied to the gating transistor precedes a corresponding transition in the switching signal by said predetermined delay time.

27. The power converter of claim 23 further comprising a circuit sub-module for substantially protecting the circuit module in the event of an electrical power surge.

28. The power converter of claim 27 wherein said circuit module further comprises additional winding means for sufficiently increasing the amplitude of the switching signal to enable said first and second power transistors to effectively switch from each respective on state to each respective off state and vice versa, independently of whether the converter is configured to supply a relatively low-voltage output signal.

29. The power converter of claim 28 wherein said additional winding means are coupled in series with said secondary winding.

30. The power converter of claim 28 wherein said additional winding means bypass said secondary winding to be respectively coupled to each respective gate terminal of the first and second power transistors.

31. The power converter of claim 27 wherein the circuit sub-module includes circuit interface means for electrically interconnecting additional circuit modules to the first circuit module to increase current rating of the power converter without causing undesirable electrical cross-coupling among the first circuit module and the additional circuit modules.

32. The power converter of claim 21 further comprising a circuit sub-module for substantially protecting the circuit module in the event of an electrical power surge.

33. The power converter of claim 21 wherein said circuit module further comprises additional winding means for sufficiently increasing the amplitude of the switching signal to enable said first and second power transistors to effectively switch from each respective on state to each respective off state and vice versa, independently of whether the converter supplies a relatively low-voltage output signal.

34. The power converter of claim 32 wherein the circuit sub-module includes circuit interface means for electrically interconnecting additional circuit modules to the first circuit module to increase current rating of the power converter without causing undesirable electrical cross-coupling among the first circuit module and the additional circuit modules.

35. In a DC-to-DC power converter generally having a transformer core electromagnetically coupled to respective primary and secondary windings, and wherein the transformer core is excited in response to a predetermined input signal received at the primary winding so that the secondary winding generates a switching signal having multiple levels of amplitude including, at least during a predetermined switching interval, an amplitude level corresponding to substantially zero amplitude, a first circuit module comprising:

first and second input terminals for receiving the switching signal;

a first power transistor having respective gate, drain and source terminals, the drain terminal of said first power transistor coupled to the first input terminal of the circuit module, the gate terminal of said first power transistor coupled to the second input terminal of the circuit module;

a second power transistor having respective gate, drain and source terminals, the drain terminal of said second power transistor coupled to the second input terminal of the circuit module, the gate terminal of that second power transistor coupled to the first input terminal of the circuit module, and the respective source terminals of the first and second power transistors being mutually coupled to one another; and a gating circuit coupled to a predetermined one of the power transistors, the gating circuit configured for substantially maintaining a predetermined voltage level across the gate terminal of the predetermined one of the power transistors at least during said switching interval of substantially zero amplitude, said predetermined voltage level being chosen to enable that predetermined power transistor to continue in a respective "on" state notwithstanding the presence of said switching interval of substantially zero amplitude, said gating circuit further configured for removing said predetermined voltage level upon termination of said switching interval of substantially zero amplitude to enable said predetermined power transistor to transition to a respective "off" state, and wherein the gating circuit in turn comprises:

a gating transistor having respective emitter, collector and base terminals, the collector terminal of said transistor coupled to the gate terminal of the predetermined one of the power transistors, the emitter terminal coupled to the source terminal of the other power transistor, and the base terminal of said gating transistor coupled to receive a predetermined gating signal.

36. The circuit module of claim 35 wherein the gating circuit further comprises a first diode having respective anode and cathode terminals, the cathode terminal of said first diode coupled to the gate terminal of the predetermined power transistor, and the anode terminal of said first diode coupled to the circuit module input terminal being coupled through said first diode to the gate terminal of said predetermined power transistor.

37. The circuit module of claim 36 wherein the gating circuit further comprises a second diode having respective anode and cathode terminals, the anode terminal of said second diode coupled to the source terminal of the predetermined power transistor, and the cathode terminal of said second diode coupled to the gate terminal of the predetermined power transistor.

38. The circuit module of claim 37 wherein the second diode comprises a Zener diode.

39. The circuit module of claim 35 further comprising a circuit sub-module for substantially protecting the circuit module in the event of an electrical power surge.

40. In a DC-to-DC power converter generally having a transformer core electromagnetically coupled to respective primary and secondary windings, and wherein the transformer core is excited in response to a predetermined input signal received at the primary winding so that the secondary winding generates a switching signal having multiple levels of amplitude including, at least during a predetermined switching interval, an amplitude level corresponding to substantially zero amplitude, a first circuit module comprising:

first and second input terminals for receiving the switching signal;

a first power transistor having respective gate, drain and source terminals, the drain terminal of said first power transistor coupled to the first input terminal of the circuit module, the gate terminal of said first power transistor coupled to the second input terminal of the circuit module;

a second power transistor having respective gate, drain and source terminals, the drain terminal of said second power transistor coupled to the second input terminal of the circuit module, the gate terminal of that second power transistor coupled to the first input terminal of the circuit module, and the respective source terminals of the first and second power transistors being mutually coupled to one another; and a gating circuit coupled to a predetermined one of the power transistors, the gating circuit configured for substantially maintaining a predetermined voltage level across the gate terminal of the predetermined one of the power transistors at least during said switching interval of substantially zero amplitude, said predetermined voltage level being chosen to enable that predetermined power transistor to continue in a respective "on" state notwithstanding the presence of said switching interval of substantially zero amplitude, said gating circuit further configured for removing said predetermined voltage level upon termination of said switching interval of substantially zero amplitude to enable said predetermined power transistor to transition to a respective "off" state, and wherein the gating circuit in turn comprises:

an inductor having two terminals, one terminal of said inductor coupled to the gate terminal of the predetermined power transistor;

a gating transistor having respective emitter, collector and base terminals, the collector terminal of the gating transistor coupled to the other terminal of the inductor, and the base terminal of said gating transistor coupled to receive a predetermined gating signal;

a first diode having respective anode and cathode terminals, the cathode terminal of said first diode coupled to the gate terminal of the predetermined power transistor, and the anode terminal of said first diode coupled to the circuit module input terminal coupled through said first diode to the gate terminal of said predetermined power transistor;

a second diode having respective anode and cathode terminals, the anode terminal of said second diode coupled to the source terminal of the predetermined power transistor, and the cathode terminal of said second diode coupled to the gate terminal of the predetermined power transistor; and a third diode having respective anode and cathode terminals, the anode terminal of said third diode coupled to the emitter terminal of the gating transistor, and the cathode terminal of said third diode coupled to the input terminal of the circuit module coupled to the drain terminal of the predetermined power transistor.

41. The circuit module of claim 40 wherein the second diode comprises a Zener diode.

42. The circuit module of claim 40 further comprising a delay unit coupled to introduce, relative to the predetermined gating signal applied to the gating transistor, a predetermined delay time in the switching signal.

43. The circuit module of claim 42 wherein each transition from a logic zero to a logic one of the predetermined gating signal applied to the gating transistor precedes a corresponding transition in the switching signal by said predetermined delay time.

44. The circuit module of claim 40 further comprising a circuit sub-module for substantially protecting the power transistors in the event of an electrical power surge.

45. The circuit module of claim 40 further comprising respective winding means for sufficiently increasing the amplitude of the switching signal to enable said first and second power transistors to effectively switch from each respective on state to each respective off state and vice versa, independently of whether the converter is configured to supply a relatively low-voltage output signal.

46. The circuit module of claim 45 wherein said respective winding means comprises a separate winding coupled in series to each side of the secondary winding.

47. The circuit module of claim 45 wherein said respective winding means bypasses said secondary winding and comprises a separate winding directly coupled to each respective gate terminal of the first and second power transistors.

48. The circuit module of claim 44 wherein the circuit sub-module includes circuit interface means for electrically interconnecting additional circuit modules to the first circuit module to increase current rating of the power converter without causing undesirable electrical cross-coupling among the first circuit module and the additional circuit modules.

49. The circuit module of claim 42 further comprising respective winding means for sufficiently increasing the amplitude of the switching signal to enable said first and second power transistors to effectively switch from each respective on state to each respective off state and vice versa, independently of whether the converter supplies a relatively low-voltage output signal.

50. A power converter using a switching signal having at least ternary levels of amplitude, one of said ternary levels having an amplitude level of substantially zero amplitude at least during a predetermined switching interval, said power converter comprising:

a transformer core electromagnetically coupled to respective primary and secondary windings, said core being excited by said primary winding so that the secondary winding generates said switching signal;

a circuit module having first and second input terminals for receiving the switching signal, said circuit module in turn comprising:

a first power transistor having respective gate, drain and source terminals, the drain terminal of said first power transistor coupled to the first input terminal of the circuit module, the gate terminal of said first power transistor coupled to the second input terminal of the circuit module;

a second power transistor having respective gate, drain and source terminals, the drain terminal of said second power transistor coupled to the second input terminal of the circuit module, the gate terminal of that second power transistor coupled to the first input terminal of the circuit module, and the respective source terminals of the first and second power transistors being mutually coupled to one another; and a gating circuit coupled to a predetermined one of the power transistors, the gating circuit configured for substantially maintaining a predetermined voltage level across the gate terminal of the predetermined one of the power transistors at least during said switching interval of substantially zero amplitude, said predetermined voltage level being chosen to enable that predetermined power transistor to continue in a respective "on" state notwithstanding the presence of said switching interval of substantially zero amplitude, said gating circuit further configured for removing said predetermined voltage upon termination of said switching interval of substantially zero amplitude level to enable said predetermined power transistor to transition to a respective "off" state, and wherein the circuit means in turn comprises:

a gating transistor having respective emitter, collector and base terminals, the collector terminal of said transistor coupled to the gate terminal of the predetermined one of the power transistors, the emitter terminal coupled to the source terminal of the other power transistor, and the base terminal of said gating transistor coupled to receive a predetermined gating signal.

51. The power converter of claim 50 wherein the gating circuit further comprises a first diode having respective anode and cathode terminals, the cathode terminal of said first diode coupled to the gate terminal of the predetermined power transistor, and the anode terminal of said first diode coupled to the circuit module input terminal being coupled through said first diode to the gate terminal of said predetermined power transistor.

52. The power converter of claim 51 wherein the gating circuit further comprises a second diode having respective anode and cathode terminals, the anode terminal of said second diode coupled to the source terminal of the predetermined power transistor, and the cathode terminal of said second diode coupled to the gate terminal of the predetermined power transistor.

53. The power converter of claim 52 wherein the second diode comprises a Zener diode.

54. A power converter using a switching signal having at least ternary levels of amplitude, one of said ternary levels having an amplitude level of substantially zero amplitude at least during a predetermined switching interval, said power converter comprising:

a transformer core electromagnetically coupled to respective primary and secondary windings, said core being excited by said primary winding so that the secondary winding generates said switching signal;

a circuit module having first and second input terminals for receiving the switching signal, said circuit module in turn comprising:

a first power transistor having respective gate, drain and source terminals, the drain terminal of said first power transistor coupled to the first input terminal of the circuit module, the gate terminal of said first power transistor coupled to the second input terminal of the circuit module;

a second power transistor having respective gate, drain and source terminals, the drain terminal of said second power transistor coupled to the second input terminal of the circuit module, the gate terminal of that second power transistor coupled to the first input terminal of the circuit module, and the respective source terminals of the first and second power transistors being mutually coupled to one another; and a gating circuit coupled to a predetermined one of the power transistors, the gating circuit configured for substantially maintaining a predetermined voltage level across the gate terminal of the predetermined one of the power transistors at least during said switching interval of substantially zero amplitude, said predetermined voltage level being chosen to enable that predetermined power transistor to continue in a respective "on" state notwithstanding the presence of said switching interval of substantially zero amplitude, said circuit means further configured for removing said predetermined voltage upon termination of said switching interval of substantially zero amplitude level to enable said predetermined power transistor to transition to a respective "off" state, and wherein the gating circuit in turn comprises:

an inductor having two terminals, one terminal of said inductor coupled to the gate terminal of the predetermined power transistor;

a gating transistor having respective emitter, collector and base terminals, the collector terminal of the gating transistor coupled to the other terminal of the inductor, and the base terminal of said gating transistor coupled to receive a predetermined gating signal;

a first diode having respective anode and cathode terminals, the cathode terminal of said first diode coupled to the gate terminal of the predetermined power transistor, and the anode terminal of said first diode coupled to the circuit module input terminal coupled through said first diode to the gate terminal of said predetermined power transistor;

a second diode having respective anode and cathode terminals, the anode terminal of said second diode coupled to the source terminal of the predetermined power transistor, and the cathode terminal of said second diode coupled to the gate terminal of the predetermined power transistor; and a third diode having respective anode and cathode terminals, the anode terminal of said third diode coupled to the emitter terminal of the gating transistor, and the cathode terminal of said third diode coupled to the input terminal of the circuit module coupled to the drain terminal of the predetermined power transistor.

55. The power converter of claim 54 wherein the second diode comprises a Zener diode.

56. The power converter of claim 54 further comprising a delay unit coupled to introduce, relative to the predetermined gating signal applied to the gating transistor, a predetermined delay time in the switching signal.

57. The power converter of claim 56 wherein each transition from a logic zero to a logic one of the predetermined gating signal applied to the gating transistor precedes a corresponding transition in the switching signal by said predetermined delay time.

58. The power converter of claim 54 further comprising a circuit sub-module for substantially protecting the circuit module in the event of an electrical power surge.

59. The power converter of claim 54 wherein said circuit module further comprises additional winding means for sufficiently increasing the amplitude of the switching signal to enable said first and second power transistors to effectively switch from each respective on state to each respective off state and vice versa, independently of whether the converter is configured to supply a relatively low-voltage output signal.

60. The power converter of claim 59 wherein said additional winding means are coupled in series with said secondary winding.

61. The power converter of claim 59 wherein said additional winding means bypass said secondary winding to be respectively coupled to each respective gate terminal of the first and second power transistors.

62. The power converter of claim 58 wherein the circuit sub-module includes circuit interface means for electrically interconnecting additional circuit modules to the first circuit module to increase current rating of the power converter without causing undesirable electrical cross-coupling among the first circuit module and the additional circuit modules.

\* \* \* \* \*